No. 866,037. PATENTED SEPT. 17, 1907.
R. KOLLMAR.
CIGAR CUTTER.
APPLICATION FILED JAN. 25, 1907.

WITNESSES:
E. A. Pell
R. Johnson

INVENTOR
Robert Kollmar,
BY
Wm. H. Canfield,
ATTORNEY

THE NORRIS PETERS CO., WASHINGTON, D. C.

UNITED STATES PATENT OFFICE.

ROBERT KOLLMAR, OF NEWARK, NEW JERSEY.

CIGAR-CUTTER.

No. 866,037.　　　　Specification of Letters Patent.　　　　Patented Sept. 17, 1907.

Application filed January 25, 1907. Serial No. 353,941.

*To all whom it may concern:*

Be it known that I, ROBERT KOLLMAR, a citizen of the United States, residing at Newark, in the county of Essex and State of New Jersey, have invented certain new and useful Improvements in Cigar-Cutters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a cigar cutter that is designed to be ornamental, and consists of a cutting apparatus that can be slid into a casing which can take the form of a locket, or similar article of jewelry, and the cigar cutter has a spring actuated blade tending to be normally thrown open, and this blade has one edge that acts as a lock to prevent the cutting apparatus to accidentally project from the casing. The device is designed, also, to have this spring action of the blade, which tends to throw it open, operate to slide the cutting apparatus from its casing when the catch, referred to above, is manually released.

The device further provides for a guide-way inside the casing to insure the operation of the cutting apparatus in its movement into and out of the casing, and prevents the sticking or jamming of the cutting apparatus when being slid into or withdrawn from its casing.

The invention is illustrated in the accompanying drawings, in which

Figure 1:
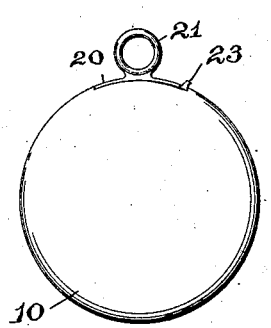
Figure 2:
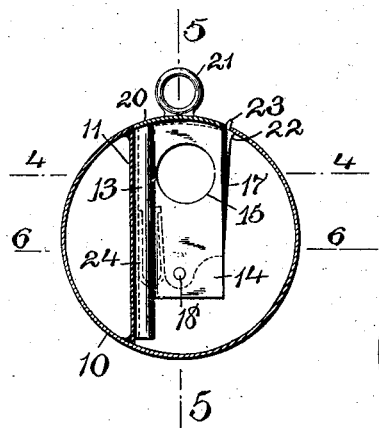
Figure 3:
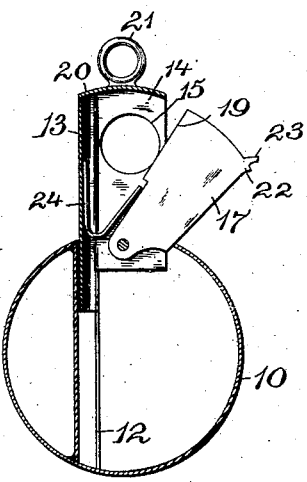
Figure 4:
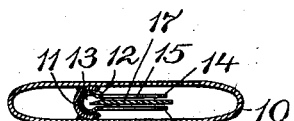
Figure 6:
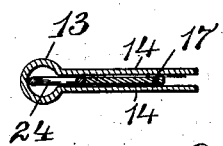
Figure 5:
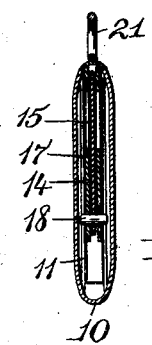

Figure 1 is a side view of the cigar cutter inclosed in a piece of jewelry, in the shape of a charm. Fig. 2 is a section of the charm with the cutting apparatus shown in elevation, and showing the cutting apparatus inside the casing. Fig. 3 is a similar view, but showing the cutting apparatus in section, but with the blade in elevation, this view showing the cutting apparatus projecting from the casing, and in a position to be operated to cut off a cigar end. Fig. 4 is a section on line 4, 4, in Fig. 2, and Fig. 5 is a section on line 5, 5, in Fig. 2. Fig. 6 is an enlarged section of the cutting apparatus alone, and taken at line 6, 6, in Fig. 2.

In the device illustrated, the casing 10 is made in the form of a charm, but of course this particular contour or ornamentation can be varied at will. Inside this casing is a tubular post 11 which is soldered or otherwise secured to the inside of the casing 10, and this post is open at one side, having a longitudinal slot 12. The tubular post embraces and guides the sleeve 13 which has the projecting wings 14, these wings being perforated with the perforations in alinement, as shown at 15. The blade 17 is pivoted on a pin 18 which passes through the wings 14, and the blade has a cutting edge 19 which serves to cut off the cigar ends that are inserted in the perforations 15. On the top of the wings 14 and the sleeve 13, is a plate 20 arranged to be flush with the outside of the casing 10, when the cutting apparatus is slid into the casing, and to act as a cover for the cutting apparatus.

A ring 21 is soldered or otherwise secured to the top of the plate 20 to allow for the suspension of the cutter, and also to provide means for manually operating it. The blade 17 has a nose 22 which engages one edge of the perforation through which the cutting apparatus slides into and out of the casing, and acts as a lock as shown in Fig. 2. A small finger piece 23 can be provided, adjacent to the nose 22, to allow an operator to press with the finger-nail to release the nose 22, and thus allow the withdrawal of the cutting apparatus. The blade is normally thrown open by means of a spring 24, which is preferably a U-shaped spring, such as shown in the drawing, and this spring action causes the back end of the blade 17 to act as a cam to force the cutting apparatus from its casing, after it is manually started, and the spring also acts to compel the nose 22 to lock the cutting apparatus in its casing, when it is slid in.

This device makes a positive working cutter, and when the cutting apparatus is slid in the casing, when the casing takes on the form of ornamental jewelry, as in the illustration, it can be worn as jewelry, and the cutting apparatus cannot be seen unless it is purposely brought forth from its casing.

The pin 18 is preferably made to project on the two sides of the pair of wings 14, so as to engage the casing, adjacent to the perforation where the cutting apparatus emerges, to act as a stop to limit the movement of the cutting apparatus when it is being withdrawn. Other means, however, can be employed for limiting the outward movement of the cutting apparatus from its casing, such as studs or projections suitably disposed on the wings 14, and this is merely a matter for the mechanic to install.

Having thus described my invention, what I claim is:—

1. A cigar cutter comprising a casing, a cutting apparatus having parallel wings, the wings being perforated, a blade pivoted between the wings and arranged to swing across the perforations, a spring to normally throw the blade from between the wings, and means on the blade for locking the cutting apparatus in the casing.

2. A cigar cutter comprising a casing, a cutting apparatus in sliding relation to the casing, the cutting apparatus having a pair of perforated wings, a blade movably arranged between the wings, a spring to actuate the blade in one direction, one edge of the blade engaging the casing when the cutting apparatus is inclosed by the casing to lock the parts together.

3. A cigar cutter comprising a casing, a tubular post therein, a cutting apparatus comprising a sleeve embraced by the tubular post, projecting wings on the sleeve, the wings being perforated, and a blade movably arranged between the wings.

4. A cigar cutter comprising a casing, a tubular post in the casing, a cutting apparatus comprising a sleeve, wings projecting from the sleeve, a cover on the wings and the sleeve, a blade pivoted between the wings, a spring to normally throw the blade open, and a nose on the back of the blade to engage the casing to lock the cutting apparatus in its inclosed position.

5. A cigar cutter comprising a casing, a tubular post in the casing, a cutting apparatus comprising a sleeve, wings projecting from the sleeve, a cover on the wings and the sleeve, a blade pivoted between the wings, a spring to normally throw the blade open, and a finger piece on the blade to allow the manual operation of the blade to release the cutting apparatus from its casing.

6. A cigar cutter comprising a casing, a tubular post in the casing, the post having a slot in one side, a sleeve in the post, wings projecting from the sleeve through the slot in the casing, the wings being perforated, a blade pivoted between the wings and arranged to swing, a spring acting to normally throw the blade open, a nose on the back of the blade to engage the edge of the casing, a finger piece on the blade for its manual operation, a pin pivoting the blade between the wings and projecting beyond the wings to serve as a stop to limit the withdrawal of the cutting apparatus from its casing.

In testimony, that I claim the foregoing, I have hereunto set my hand this 24th day of January 1907.

ROBERT KOLLMAR.

Witnesses:
WM. H. CAMFIELD,
E. A. PELL.